United States Patent
McNalley

(10) Patent No.: US 6,641,014 B2
(45) Date of Patent: Nov. 4, 2003

(54) BOW CADDY FOR TRANSPORTATION AND STORAGE OF A BOW

(76) Inventor: Arliss McNalley, 106 Ramsey Ave., Red Deer, Alberta (CA), T4P 3K1

( * ) Notice: Subject to any disclaimer, the term of this patent is extended or adjusted under 35 U.S.C. 154(b) by 29 days.

(21) Appl. No.: 09/988,092

(22) Filed: Nov. 19, 2001

(65) Prior Publication Data

US 2003/0094471 A1 May 22, 2003

(51) Int. Cl.[7] .................................................. B60R 9/00
(52) U.S. Cl. ....................... 224/405; 224/281; 224/282; 224/547; 224/552; 224/553; 224/554; 224/557; 224/571; 224/916
(58) Field of Search ................................. 224/403, 404, 224/405, 281, 282, 500, 501, 505, 517, 523, 533, 536, 537, 546, 547, 552, 553, 554, 557, 567, 570, 571, 916

(56) References Cited

U.S. PATENT DOCUMENTS

| | | | |
|---|---|---|---|
| 2,632,619 A | | 3/1953 | Wilson |
| 3,893,568 A | * | 7/1975 | Lile ........................... 211/49.1 |
| 4,057,183 A | * | 11/1977 | Ness ........................... 224/540 |
| 4,331,311 A | | 5/1982 | Russell |
| 4,469,257 A | * | 9/1984 | Parker ........................ 224/403 |
| 4,542,873 A | | 9/1985 | Matherly et al. |
| 4,915,273 A | | 4/1990 | Allen |
| 4,957,229 A | | 9/1990 | Freeman |
| 5,249,722 A | | 10/1993 | Horn |
| 5,360,190 A | | 11/1994 | Walker et al. |
| 5,482,241 A | | 1/1996 | Oglesby |
| 5,595,333 A | | 1/1997 | Boston |
| 5,641,106 A | | 6/1997 | Slaughter et al. |
| 5,791,610 A | | 8/1998 | Sanchez |
| 5,878,929 A | | 3/1999 | Leonard |
| 6,199,734 B1 | * | 3/2001 | Meeks ........................ 224/401 |

* cited by examiner

Primary Examiner—Stephen K. Cronin
(74) Attorney, Agent, or Firm—Antony C. Edwards

(57) ABSTRACT

A cantilevered member mounted at a first end to the base and extending cantilevered from the base to an opposite second end, opposite to the first end, and a cross-member mounted to the second end of the cantilevered member, the cross-member having opposite first and second ends. The cantilevered member may be releasably pivotally mounted to the base so as to be selectively angularly positionable relative to the base. A rigid first arm is pivotally and slidably mounted to the first end of the cross member. A rigid second arm is pivotally and slidably mounted to the second end of the cross-member. The first and second arms are parallel to the cross-member and mounted for sliding and pivoting in a plane parallel to a plane containing the cross-member.

15 Claims, 2 Drawing Sheets

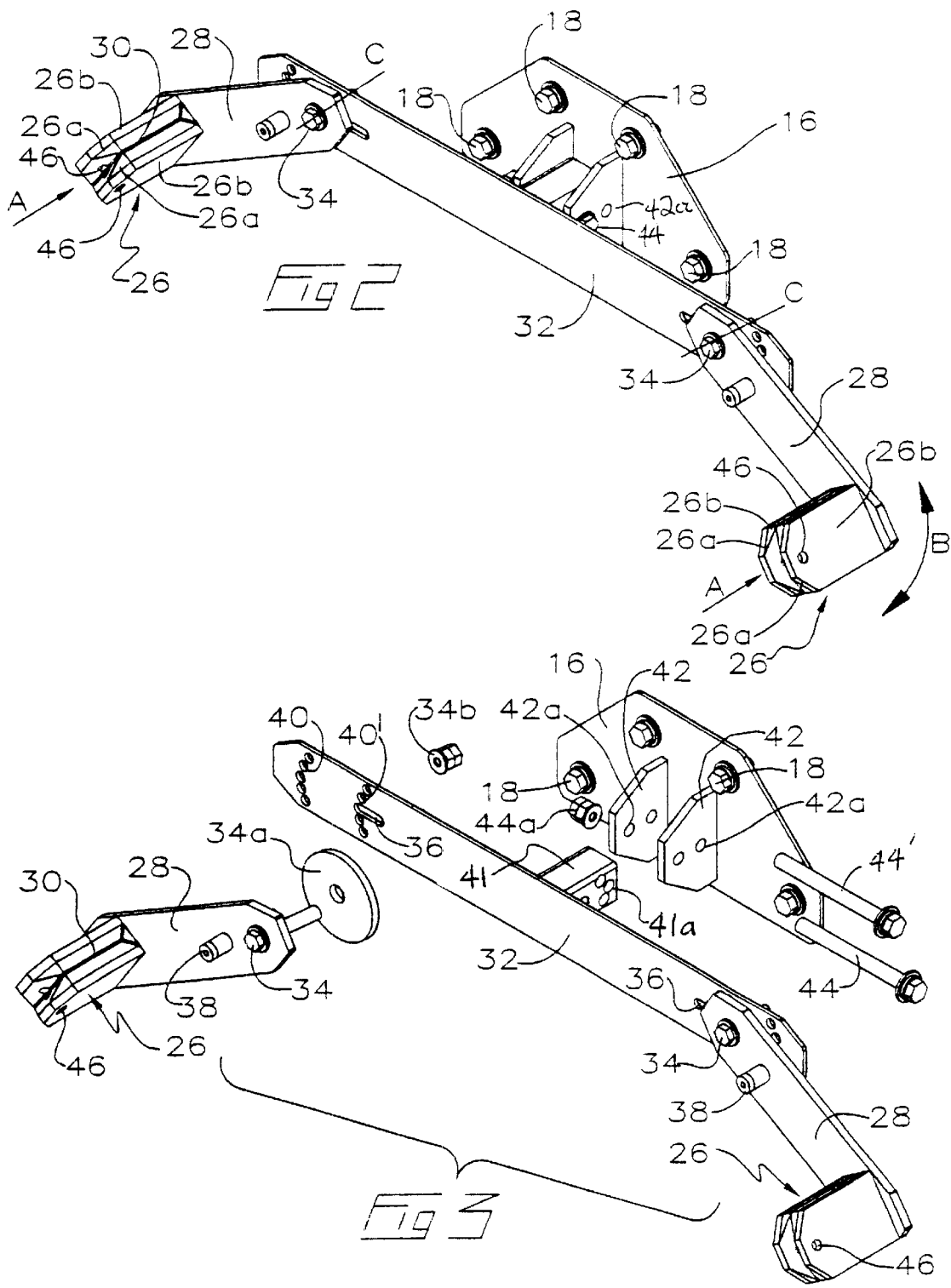

BOW CADDY FOR TRANSPORTATION AND STORAGE OF A BOW

FIELD OF THE INVENTION

This invention relates to the field of racks for supporting bows generally, and in particular, to a caddy for supporting a bow above the wheel well of a pickup truck.

BACKGROUND OF THE INVENTION

Archery and bow hunting are known recreational sports, both of which employing bows, for example compound bows as are well known in the prior art, as the primary equipment employed by the sportsman. It is quite often the case that, for a variety of reasons including travel over rugged terrain, that sportsmen use pickup trucks, ATV's or the like as transportation to and from the sports venue whether it be indoor or outdoor.

Because equipment is intended to be carried, for example, in the box of the pickup truck, it is quite often the case that an often expensive bow will, when placed into the box of the pickup truck, come to harm, for example by collisions with other material being transported as the material slides and bounces around in the pickup truck box.

It is also known in the prior art to provide portable storage cases for storing and transporting of bows and arrows. Such cases may be either padded fabric cases or hard-shelled plastic cases. In either event, applicant is unaware of devices which will prevent the cases from sliding or otherwise moving around, for example in the back of a pickup truck box during transport, consequently inviting damage not only to the case, but also potentially to the bow stored within the case.

Consequently it is an object of the present invention to provide a rack or caddy (hereinafter referred to collectively as a caddy) for securely mounting a bow in, for example, the box of a pickup truck so as to provide a releasably securable clamping of the bow suspended for transport, in the case of a pickup truck above the floor of the box or in the case of an ATV secured to the ATV so as to inhibit damage to the bow while still providing for ease of access to the bow by the sportsman.

Applicant is aware of U.S. Pat. No. 5,791,610 which issued Aug. 11, 1998 to Sanchez for a quick release bow rack. Sanchez discloses "A quick release bow rack for securing an archery bow on or within a vehicle. The bow rack includes an elongated supporting member which supports two clamps in a spaced relationship. The clamps hold the limbs of archery bow, and are spring biased toward the open position. Each clamp is held in the closed position by a latch which is pivotally attached to one of the jaws of the clamp and is capable of engaging the other jaw of the clamp. Each latch is connected to a cable which disengages the respective latch from one of the jaws of the respective clamp, when the cable is pulled. The cables connected to the latches are connected to a single pivoting lever such that pulling on the lever causes both cables to be pulled, thus allowing both clamps to spring open and allowing a bow held in the rack to be quickly removed.".

Among other deficiencies of the Sanchez teaching, Sanchez provides an elongate rigid supporting member upon which the clamps are slidably mounted. Thus, when the clamps are slid towards one another to accommodate a particular size of bow, the ends of the supporting member are left to protrude outwardly of the clamps thereby causing inconvenience during use and storage.

SUMMARY OF THE INVENTION

In summary, the bow caddy of the present invention includes a base, a cantilevered member mounted at a first end to the base and extending cantilevered from the base to an opposite second end, opposite to the first end, and a cross-member mounted to the second end of the cantilevered member, the cross-member having opposite first and second ends. The cantilevered member may be releasably pivotally mounted to the base so as to be selectively angularly positionable relative to the base. A rigid first arm is pivotally and slidably mounted to the first end of the cross member. A rigid second arm is pivotally and slidably mounted to the second end of the cross-member. The first and second arms are parallel to the cross-member and mounted for sliding and pivoting in a plane parallel to a plane containing the cross-member.

Locking means releasably lock the first and second arms in desired angular and longitudinal displacement relative to the cross-member. Frictional clamps are rigidly mounted at distal ends of the first and second arms. The clamps frictionally engage oppositely disposed limbs of a bow to be mounted in the caddy. The bow is mounted by adjustment of relative positioning between the clamps and the first and second arms so as to accommodate the limbs of the bow in the clamps without substantial distortion of the bow.

In one embodiment the base may be a planar mounting plate and the cantilevered member may extend orthogonally to the plate. The cantilevered member may be mounted to the cross-member so as to generally bisect the cross member along its length. The cross-member may extend a length less than a length of the bow. The arms may be generally the same length and have a cumulative length less than or equal to the length of the cross-member. The arms may be pivotally mounted to the cross-member so as to pivot about axes of rotation which are generally perpendicular to the base.

The locking means may include a tightenable fastener mounted along the axes of rotation of the arms so as to frictionally clamp the arms to the cross-member. The locking means may alternatively, or may further include resiliently biased locking pins mounted to the arms for releasably engaging locking apertures in the cross member. The locking apertures may be a radially spaced-apart array of apertures, radially spaced-apart about the axes of rotation.

The cross members have at least one slot in each end of the cross member. The fastener may be a rigid member journalled through each of the slots. The slots may be collinear, each slot having opposite first and second ends. The apertures in the cross-member may include first and second radially spaced-apart arrays of apertures. The first array may correspond to a locking pin arc of rotation when the fastener is positioned in the first end of the slot. The second array may coincide with the position of the locking pin when the fastener is in the second end of the slot.

The cantilevered member may be of a length so as to cantilever the cross-member over a wheel well of a pickup truck box when the base is mounted to a side panel of the box corresponding to the wheel well, although this is not intended to be limiting.

The clamps may be generally U-shaped members sandwiching therebetween resilient padding. The resilient padding defines a cavity therebetween for receiving into the cavity the limbs of the bow for resiliently releasably engaging the limbs between the pads. The clamps may each have opposed facing apertures in the distal ends of the clamps for receiving locking members therethrough so as to releasably lock the limbs of the bow in the clamp.

BRIEF DESCRIPTION OF THE DRAWINGS

FIG. 2 is, in perspective view, the bow caddy of FIG. 1.

FIG. 3 is, in partially-exploded perspective view, the bow caddy of FIG. 2.

DETAILED DESCRIPTION OF EMBODIMENTS OF THE INVENTION

Figure 1:
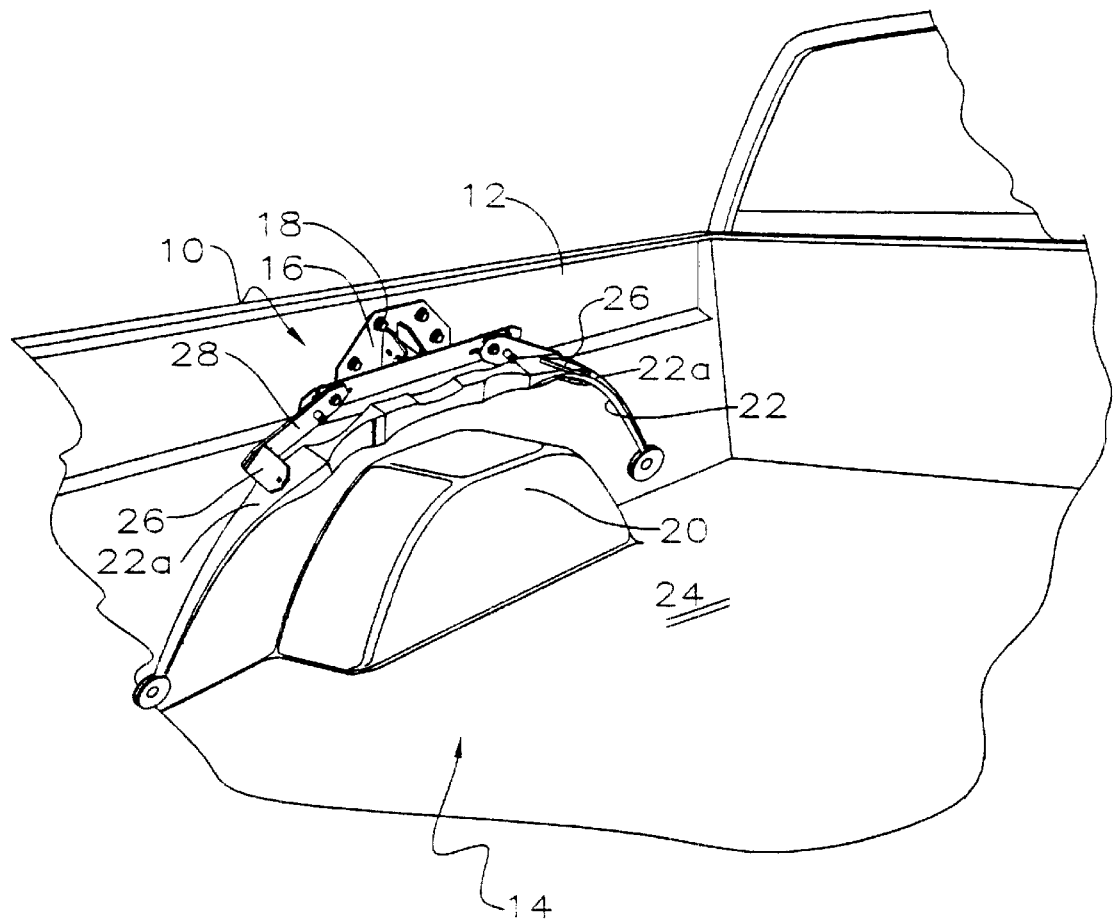
FIG. 1 is, in perspective view, a bow mounted in a bow caddy according to the present invention.

As seen in FIG. 1, the bow caddy 10 of the present invention is mountable to a side panel 12 of a pickup truck box 14. This in intended to be an illustrative example and not intended to be limiting as the bow caddy of the present invention may be mounted in other locations (for example the front wall) in a pickup truck box, on an all terrain vehicle (ATV), in a storage or display area, etc. Thus, in particular, as better seen in FIGS. 2 and 3 and by way of illustration, a rigid mounting plate 16 securely mounts to side panel 12 by means of fasteners 18 such as bolts or screws.

Mounting plate 16 may be mounted to side panel 12 above wheel well 20 so that when bow 22 is supported within bow caddy 10 as better hereinafter described, bow 22 is suspended above wheel well 20 so as to reduce the risk of harm to the bow caused by items (not shown) sliding towards the bow over the floor 24 of the pickup truck box 14.

Bow 22 is releasably frictionally clamped by and between a pair of bow mounting brackets 26 mounted, respectively, at the distal ends of adjustable arms 28. Each of the bow mounting brackets 26 includes an opposed facing pair of resiliently padded frictional clamping pads 26a sandwiched between rigid backing plates 26b so as to dispose the pads for frictionally and resiliently gripping of a segment of bow 22 when inserted in direction A into the channel or spacing 30 defined between the most closely adjacent faces of pads 26a. In one embodiment, the peripheral edges of pads 26a are bevelled so as to ease entry of segments 22a of bow 22 into spacing 30, which may be defined between spaced-apart parallel opposed facing bow-engaging surfaces of pads 26a.

Adjustable arms 28 are advantageously pivotally mounted to a rigid cross-bar 32 so as to rotate in a plane parallel to a plane containing cross-bar 32 for rotation of adjustable arms 28 in direction B about axes of rotation C. In the embodiment illustrated, which is not intended to be limiting, arms 28 rotate about axes of rotation C by rotation of the arms about bolts 34, which may otherwise be pins or shafts or the like, journalled through collinear slots 36 extending longitudinally along cross-bar 32. The hub about which arms 28 rotate in direction C may be greased or otherwise lubricated. Bolts 34 as illustrated may employ washers 34a and be fastened in slots 36 by nuts 34b. In one embodiment the nuts may be permanently tight enough to provide good structural integrity, but loose enough to allow rotational and translational movement of the arms 28 with respect to cross member 32. The sliding friction between the surfaces may be minimized with the use of a grease lubricant. In an alternative embodiment not intended to be limiting loosening of nuts 34b on bolts 34 allows for adjustment of the position of arms 28 both angularly relative to cross-bar 32 about axes C and linearly along cross-bar 32 depending on the length of slots 36. The angular orientation of bow mounting brackets 26 may thus be adjusted to suit a particular curvature of a bow 22, and may be adjusted linearly so as to comfortably fit bow 22 into spacings 30 without a forced fit caused by flexing of the bow which would occur if arms 28 were not adjustable and bow 22 was not an exact match for the relative distance between the mounting brackets and the angular orientation of the mounting brackets relative to each other. To assist in adjustment of the angular orientation of arms 28 in direction B relative to cross-bar 32, spring-loaded locking pins 38 may be provided spaced along arms 28 between brackets 26 and bolts 34 so as to engage one of a radially spaced-apart array of apertures 40 or 40' depending on the position of bolts 34 along the length of slots 36. Thus, with bolts 34 adjusted to the inward extremities of slots 36, locking pins 38 may be employed to engage one of apertures 40', and with bolts 34 spaced apart to maximize the distance between arms 28, locking pins 38 may be employed to engage apertures 40. Thus, once the angular orientation of arms 28 is selected which most closely approximates the correct distance between brackets 26 and the correct angular orientation of brackets 26, locking pins 38 may be inserted into the most closely corresponding aperture 40 or 40' and nuts 34b tightened onto bolts 34.

Cross-bar 32 may be mounted to mounting plate 16 by means of a cantilevering member 41, such as the cantilevered tube illustrated, fitting snugly between a spaced-apart pair of parallel flanges 42. Bolts such as bolts 44 may be journalled through aligned apertures 42a on the flanges and a pair of desired apertures 41a in the cantilevered member. Bolts 44 and 44' may be secured by corresponding nuts 44a (only one being illustrated) so as to mount cantilevered member 40 onto mounting plate 16. As single aperture 40a is provided through member 40 closest to cross-bar 32 and a radially spaced array of three apertures 41a are provided through member 40 at the end of member 40 closest to mounting plate 16. Thus the angular orientation of member 40 relative to mounting plate 16 may be adjusted by selecting one of the three radially spaced aperture for locking using a locking pin or bolt 44'. The use of such a pivotable locking arrangement allows adjustment of the bow orientation when stored, and allows the use of plate 16 either upright (as shown) or upside down depending on personal preference or on mounting restrictions.

Aligned apertures 46 are provided in the distal ends of bow mounting brackets 26 so that, with a bow 22 mounted in the brackets, the end openings of spacings 30 may be closed off by the shank of a lock (not shown) or other releasable locking means so that the bow is locked onto the bow caddy.

In use, bow caddy 10 may also be mounted for example to the walls of a garage for safe storage of a bow up out of harm's way, and when not in use, arms 28 may be pivoted inwardly so as to store folded along cross-bar 32. When the bow caddy is used for transporting bows in the back of a pickup truck, especially over rugged terrain, the resiliency of pads 26a in bow mounting brackets 26 not only prevent the bow from becoming scratched, but also provide for dampening of vibration and shocks which might otherwise jar the bow either from brackets 26 or into a brace of engagement with a locking device in apertures 46. During such rough transportation, the advantageous mounting of the bow generally conformally over wheel well 20 inhibits loose items sliding or rolling around inside box 14 from sliding beneath the bow so as to come into contact with the bow. Upon arrival at the destination, the bow may be removed from the brackets, once unlocked, in a simple motion, for example the single motion of pulling segments 22a from spacings 30.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A bow caddy comprising:
   a base,
   a cantilevered member mounted at a first end to said base and extending cantilevered from said base to an opposite second end, opposite to said first end,
   a cross-member mounted to said second end of said cantilevered member, said cross-member having opposite first and second ends,
   a rigid first arm pivotally and slidably mounted to said first end of said cross member, and a rigid second arm pivotally and slidably mounted to said second end of said cross-member, said first and second arms parallel to said cross-member and mounted for sliding and pivoting in a plane parallel to a plane containing said cross-member,
   locking means for releasably locking said first and second arms in desired angular and longitudinal displacement relative to said cross-member,
   frictional clamps rigidly mounted at distal ends of said first and second arms for frictionally engaging oppositely disposed limbs of a bow to be mounted in said caddy upon adjustment of relative positioning between said clamps and said first and second arms so as to accommodate said limbs in said clamps without substantial distortion of said bow.

2. The device of claim 1 wherein said base is a planar mounting plate and said cantilevered member extends orthogonally to said plate.

3. The device of claim 2 wherein said cantilevered member is mounted to said cross-member so as to generally bisect said cross member along its length.

4. The device of claim 1 wherein said cross-member extends a length less than a length of the bow and wherein said arms are generally the same length and have a cumulative length less than or equal to the length of said cross-member.

5. The device of claim 1 wherein said arms are pivotally mounted to said cross-member so as to pivot about axes of rotation which are generally perpendicular to said base.

6. The device of claim 5 wherein said locking means includes a tightenable fastener mounted along said axes of rotation so as to frictionally clamp said arms to said cross-member.

7. The device of claim 6 further comprising resiliently biased locking pins mounted to said arms for releasably engaging locking apertures in said cross member.

8. The device of claim 7 wherein said locking apertures are a radially spaced-apart array of apertures, radially spaced-apart about said axes of rotation.

9. The device of claim 8 wherein said cross members have at least one slot in each said end of said cross member and wherein said fastener is a rigid member journalled through each of said slots.

10. The device of claim 9 wherein said slots are collinear and each slot has opposite first and second ends and wherein said apertures in said cross-member include first and second radially spaced-apart arrays of apertures, said first array corresponding to a locking pin arc of rotation when said fastener is positioned in said first end of said slot and wherein said second array coincides with the position of said locking pin when said fastener is in said second end of said slot.

11. The device of claim 1 wherein said cantilevered member is of a length so as to cantilever said cross-member over a wheel well of a pickup truck box when said base is mounted to a side panel of said box corresponding to said wheel well.

12. The device of claim 1 wherein said cantilevered member is releasably mounted to said base.

13. The device of claim 1 wherein said clamps are generally U-shaped members sandwiching therebetween resilient padding, said resilient padding defining a cavity therebetween for receiving into said cavity the limbs of the bow for resiliently releasably engaging said limbs between said pads.

14. The device of claim 1 wherein the clamps each have opposed facing apertures in the distal ends of the clamps for receiving locking members therethrough so as to releasably lock the limbs of the bow in the clamp.

15. The device of claim 1 wherein said cantilevered member is selectively angularly positionable relative to said base.

* * * * *